(12) United States Patent
Wang et al.

(10) Patent No.: US 11,900,743 B2
(45) Date of Patent: Feb. 13, 2024

(54) SECURITY AUTHENTICATION METHOD AND SECURITY AUTHENTICATION DEVICE USING SAME

(71) Applicant: PRIMAX ELECTRONICS LTD., Taipei (TW)

(72) Inventors: Hsiu-Wen Wang, Taipei (TW); Chih-Wen Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 48 days.

(21) Appl. No.: 17/821,809

(22) Filed: Aug. 24, 2022

(65) Prior Publication Data

US 2024/0021034 A1 Jan. 18, 2024

(30) Foreign Application Priority Data

Jul. 12, 2022 (TW) .................................. 111126181

(51) Int. Cl.
*G07C 9/00* (2020.01)
*G10L 17/24* (2013.01)
*G08B 21/18* (2006.01)
*G06V 40/20* (2022.01)
*G06V 40/10* (2022.01)

(52) U.S. Cl.
CPC ......... *G07C 9/00563* (2013.01); *G06V 40/10* (2022.01); *G06V 40/20* (2022.01); *G08B 21/18* (2013.01); *G10L 17/24* (2013.01)

(58) Field of Classification Search
None
See application file for complete search history.

(56) References Cited

U.S. PATENT DOCUMENTS

| 9,801,066 B1* | 10/2017 | Hanley | G06Q 20/40145 |
| 9,898,882 B1* | 2/2018 | Bhattacharya | G06V 40/172 |
| 2013/0015946 A1* | 1/2013 | Lau | G06V 40/172 340/5.2 |
| 2017/0226784 A1* | 8/2017 | Davis | E05B 47/00 |
| 2020/0105080 A1* | 4/2020 | Maeno | G07C 9/37 |
| 2021/0209877 A1* | 7/2021 | Neill | G06F 16/53 |
| 2021/0256976 A1* | 8/2021 | Mitsuno | G10L 17/02 |
| 2021/0258719 A1* | 8/2021 | Bosworth | H04W 4/44 |
| 2021/0358252 A1* | 11/2021 | Sabripour | G06T 7/215 |
| 2021/0370866 A1* | 12/2021 | Morosawa | G06V 20/56 |
| 2022/0245978 A1* | 8/2022 | Murata | G06T 7/70 |

(Continued)

*Primary Examiner* — Muhammad Adnan
(74) *Attorney, Agent, or Firm* — WPAT, P.C

(57) ABSTRACT

A security authentication method is provided. In a step (a), a to-be-recognized image information and a to-be-recognized voice information about a user are provided. Then, a step (b) is performed to identify and judge whether the to-be-recognized image information and the to-be-recognized voice information comply with a registered image information and a registered voice information, respectively. In a step (c), if the judging condition of the step (b) is satisfied, a security information prompt signal is generated. In a step (d), a to-be-recognized security information is provided by the user. Then, a step (e) is performed to identify and judge whether the to-be-recognized security information complies with an abnormal warning information. In a step (f), if the judging condition of the step (e) is satisfied, an abnormal state warning and processing process is performed.

16 Claims, 3 Drawing Sheets

(56) References Cited

U.S. PATENT DOCUMENTS

| | | | |
|---|---|---|---|
| 2023/0042025 A1* | 2/2023 | Kim | G06V 40/20 |
| 2023/0089155 A1* | 3/2023 | Kaneko | G06V 40/174 |
| | | | 382/103 |
| 2023/0162547 A1* | 5/2023 | Trelin | G06V 40/1365 |
| | | | 705/26.81 |
| 2023/0274597 A1* | 8/2023 | Ranganath | G07C 9/37 |
| | | | 382/118 |

* cited by examiner

SECURITY AUTHENTICATION METHOD AND SECURITY AUTHENTICATION DEVICE USING SAME

The present invention relates to a security authentication method and a security authentication device, and more particularly to a security authentication method and a security authentication device capable of identifying whether a user is in a physical discomfort state or a hostage state.

BACKGROUND OF THE INVENTION

Nowadays, various intelligent security authentication devices are introduced into the market. For example, a photographing and controlling device with monitoring and switching functions is one of the intelligent security authentication devices. The photographing and controlling devices have been widely used for controlling on/off states of electronic door locks or electronic systems with intelligent monitoring functions or applied to other application fields.

Conventionally, the intelligent security authentication device usually emits infrared light to detect whether a human body enters a certain monitoring region or whether a biometric signal associated with body temperature appears. According to the detecting result, the intelligent security authentication device judges whether the detected target is an authenticated user, and the corresponding electronic door lock or electronic system is notified to be operated in the on state or the off state. Furthermore, in order to strengthen security protection, some higher-level intelligent security authentication devices use face image information as the main recognition and confirmation core.

However, the conventional intelligent security authentication devices still have some drawbacks. For example, the use of the infrared light to detect whether the user is approaching the security authentication device cannot accurately grasp the user's true identity. Moreover, since the infrared light is readily interfered by the environments, the operation and/or the sensitivity of the control mechanism of the security authentication device is possibly abnormal.

On the other hand, in case that security authentication device uses face image information as the main recognition and confirmation core, the image recognition accuracy in the face recognition process needs to be very high. However, the face recognition process for obtaining the high image recognition accuracy usually takes a lot of recognition time. Due to the long recognition time, the detection response capability of the intelligent security authentication device is impaired. In order to increase the detection response capability of the intelligent security authentication device, the image recognition accuracy needs to be decreased. However, the decreased image recognition accuracy may result in erroneous judgment.

In some countries or regions or in some places, the security of the electronic door lock or electronic system needs to be further strengthened. For example, the user is possibly kidnapped and forced to unlock the electronic door lock or electronic system. For strengthening the security, the security authentication device needs to immediately respond to the abnormal usage scenario. However, most of the conventional security authentication devices are unable to immediately issue the anti-kidnapping warning message or even unable to directly suspend the operations of electronic systems.

Therefore, it is important to provide a novel security authentication method and a novel security authentication device in other to overcome the drawbacks of the conventional technologies.

SUMMARY OF THE INVENTION

An object of the present invention provides a security authentication method. In a security authentication process, the better balance between the recognition speed and the recognition accuracy can be achieved. Moreover, the security authentication method can provide an abnormal state processing function.

Another object of the present invention provides a security authentication device. In a security authentication process, the better balance between the recognition speed and the recognition accuracy can be achieved. Moreover, the security authentication method can provide an abnormal state processing function.

In accordance with an aspect of the present invention, a security authentication method is provided. The security authentication method at least includes the following steps. Firstly, in a step (a), a to-be-recognized image information and a to-be-recognized voice information about a user are provided. Then, a step (b) is performed to identify and judge whether the to-be-recognized image information and the to-be-recognized voice information comply with a registered image information and a registered voice information, respectively. In a step (c), if the to-be-recognized image information and the to-be-recognized voice information comply with the registered image information and the registered voice information, respectively, a security information prompt signal is generated and outputted. Then, in a step (d), a to-be-recognized security information is provided by the user in response to the security information prompt signal. Then, a step (e) is performed to identify and judge whether the to-be-recognized security information complies with an abnormal warning information. In a step (f), if the to-be-recognized security information complies with the abnormal warning information, an abnormal state warning and processing process is performed.

In an embodiment, each of the to-be-recognized image information and the registered image information contains at least one of a facial expression feature, a physiological skeleton feature and a physiological action feature.

In an embodiment, each of the to-be-recognized voice information and the registered voice information contains a voice print feature.

In an embodiment, the security information prompt signal is a voice-type security information prompt signal or an image-type security information prompt signal, and the security information prompt signal prompts the user to provide a to-be-recognized security information.

In an embodiment, each of the to-be-recognized security information and the abnormal warning information at least contains at least one of a voice string and a gesture action.

In an embodiment, the abnormal warning information at least contains at least one of an abnormal state voice string and an abnormal state gesture action.

In an embodiment, the abnormal state voice string represents that the user is in at least one of a physical discomfort state and a hostage state, or the abnormal state gesture action represents that the user is in at least one of the physical discomfort state and the hostage state.

In an embodiment, when the abnormal state warning and processing process is performed in the step (f), at least one of a door locking action and a system disabling action is performed.

In an embodiment, when the abnormal state warning and processing process is performed in the step (f), at least one of a security guard contact action, an emergency medical contact action and a user's current image information transmission action is further performed.

In an embodiment, after the step (e), the security authentication method further includes the following steps. If the to-be-recognized security information does not comply with the abnormal warning information, a step (g) is performed to identify and judge whether the to-be-recognized security information complies with a normal operation information. In a step (h), if the to-be-recognized security information complies with the normal operation information, performing a normal operation process.

In an embodiment, the normal operation information at least contains at least one of a normal state voice string and a normal state gesture action.

In an embodiment, when the normal operation process is performed in the step (h), at least one of a door unlocking action and a system enabling action is performed.

In an embodiment, after the step (g), the security authentication method further includes the following steps. In a step (i), if the to-be-recognized security information does not comply with the normal operation information, at least one of a door locking action and a system disabling action is performed. Then, a step (j) is performed to identify and judge whether a number of times the to-be-recognized security information does not comply with the normal operation information excesses a threshold count value. If the number of times the to-be-recognized security information does not comply with the normal operation information does not excess the threshold count value, the step (c) is repeatedly done. In a step (k), if the number of times the to-be-recognized security information does not comply with the normal operation information excesses the threshold count value, the user is informed that the to-be-recognized security information currently used is an erroneous prompt message, and the security authentication method is ended.

In accordance with an aspect of the present invention, a security authentication device is provided. The security authentication device at least includes an image input unit, a voice input/output unit and an identifying and processing module. A to-be-recognized image information about a user is inputted into the image input unit. A to-be-recognized voice information about the user is inputted into the voice input/output unit. A security information prompt signal is outputted from the voice input/output unit. The identifying and processing module is electrically connected with the image input unit and the voice input/output unit. After the to-be-recognized image information and the to-be-recognized voice information are received by the identifying and processing module, the identifying and processing module identifies and judges whether the to-be-recognized image information and the to-be-recognized voice information comply with a registered image information and a registered voice information, respectively. If the to-be-recognized image information and the to-be-recognized voice information comply with the registered image information and the registered voice information, respectively, the identifying and processing module generates the security information prompt signal, and the security information prompt signal is transmitted to the user through the voice input/output unit. After a to-be-recognized security information provided by the user in response to the security information prompt signal is inputted into the identifying and processing module, the identifying and processing module identifies and judges whether the to-be-recognized security information complies with an abnormal warning information. If the to-be-recognized security information complies with the abnormal warning information, an abnormal state warning and processing process is performed.

In an embodiment, the identifying and processing module at least includes an identity information recognition unit and a security information recognition unit. The identity information recognition unit is electrically connected with the image input unit and the voice input/output unit. After the to-be-recognized image information and the to-be-recognized voice information are received by the identity information recognition unit, the identity information recognition unit identifies and judges whether the to-be-recognized image information and the to-be-recognized voice information comply with the registered image information and the registered voice information, respectively. If the to-be-recognized image information and the to-be-recognized voice information comply with the registered image information and the registered voice information, respectively, the identity information recognition unit generates the security information prompt signal, and the security information prompt signal is transmitted to the user through the voice input/output unit. The security information recognition unit is electrically connected with the identity information identifying unit, the image input unit and the voice input/output unit. After the to-be-recognized security information is received by the security information recognition unit, the security information recognition unit identifies and judges whether to-be-recognized security information complies with the abnormal warning information. If the to-be-recognized security information complies with the abnormal warning information, the abnormal state warning and processing process is performed.

In an embodiment, the image input unit is an image pickup unit, and the voice input/output unit at least includes a microphone and a loudspeaker.

In an embodiment, the image input unit and the voice input/output unit are integrated into a single structure.

In an embodiment, the image input unit and the voice input/output unit are in communication with the identifying and processing module through an internet.

In an embodiment, at least one of the image input unit, the voice input/output unit and the identifying and processing module is combined with an electronic door lock or an electronic system. The image input unit, the voice input/output unit and the identifying and processing module cooperate with each other to control on/off states of the electronic door lock or the electronic system.

In an embodiment, if the to-be-recognized security information does not comply with the abnormal warning information, the identifying and processing module identifies and judges whether the to-be-recognized security information complies with a normal operation information. If the to-be-recognized security information complies with the normal operation information, the identifying and processing module performs a normal operation process.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1A:
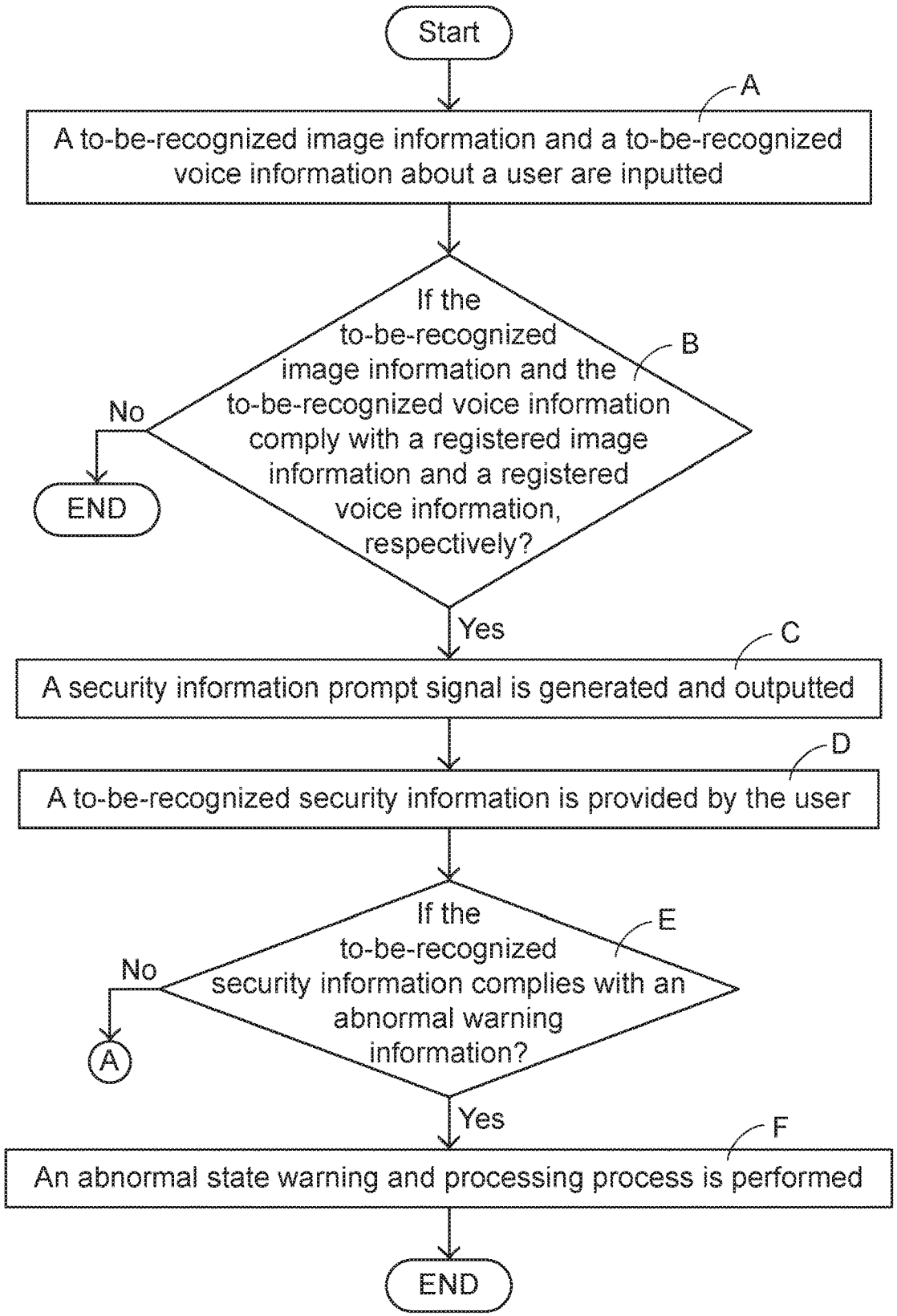
FIGS. 1A and 1B schematically illustrate a flowchart of a security authentication method for a security authentication device according to an embodiment of the present invention.
Figure 1B:
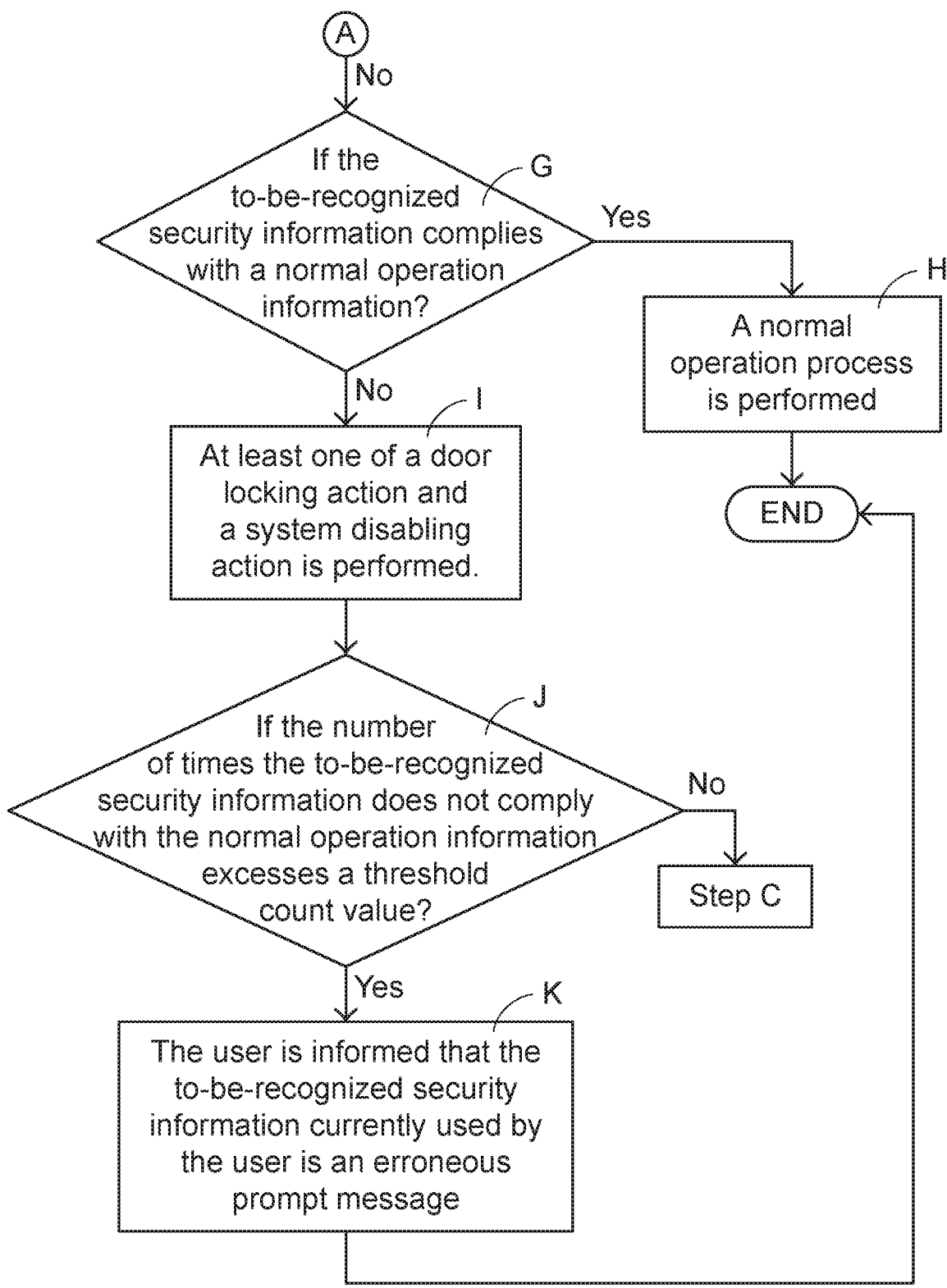

FIGS. 1A and 1B schematically illustrate a flowchart of a security authentication method for a security authentication device according to an embodiment of the present invention. The security authentication method at least comprises the following steps.

Firstly, in a step A, a to-be-recognized image information and a to-be-recognized voice information about a user (e.g., a homeowner) are inputted into the security authentication device.

Then, a step B is performed to identify and judge whether the to-be-recognized image information and the to-be-recognized voice information comply with a registered image information and a registered voice information, respectively.

Preferably, in the step A and the step B, each of the to-be-recognized image information and the registered image information contains at least one of a facial expression feature, a physiological skeleton feature and a physiological action feature, and each of the to-be-recognized voice information and the registered voice information contains a voice print feature. It is noted that the examples of the to-be-recognized image information, the registered image information, the to-be-recognized voice information and the registered voice information are not restricted.

If the judging result of the step B indicates that the to-be-recognized image information and the to-be-recognized voice information comply with the registered image information and the registered voice information, respectively, a step C is performed. In the step C, a security information prompt signal is generated and outputted. For example, the security information prompt signal is a voice-type security information prompt signal or an image-type security information prompt signal for prompting the user to provide a to-be-recognized security information.

After the step C, a step D is performed. In the step D, a to-be-recognized security information is provided by the user in response to the security information prompt signal, and the to-be-recognized security information is inputted into the security authentication device.

Then, a step E is performed to identify and judge whether the to-be-recognized security information complies with an abnormal warning information.

Preferably but not exclusively, in the step D and the step E, each of the to-be-recognized security information and the abnormal warning information at least contains at least one of a voice string and a gesture action.

Moreover, the abnormal warning information at least contains at least one of an abnormal state voice string and an abnormal state gesture action.

Preferably but not exclusively, the abnormal state voice string at least contains a voice string representing that the user is in at least one of a physical discomfort state and a hostage state, or the abnormal state gesture action at least contains a gesture action representing that the user is in at least one of the physical discomfort state and the hostage state.

An example of the voice string and an example of the gesture action for judgement will be described as follows.

1. a voice string is used for judgment:
   abnormal state voice string: OOO, please unlock door for me
2. a gesture action is used for judgment:

abnormal state gesture action: 

If the judging result of the step E indicates that the to-be-recognized security information complies with the abnormal warning information, an abnormal state warning and processing process is performed (Step F).

When the abnormal state warning and processing process is performed, at least one of a door locking action and a system disabling action is performed, or even at least one of a security guard contact action, an emergency medical contact action and a user's current image information transmission action is performed. For example, when the user's current image information transmission action is performed, the current image information of the user is transmitted to a security guard system (not shown) or an emergency medical system (not shown).

If the judging result of the step E indicates that the to-be-recognized security information does not comply with the abnormal warning information, a step G is performed to identify and judge whether the to-be-recognized security information complies with a normal operation information.

Preferably but not exclusively, the normal operation information at least contains at least one of a normal state voice string and a normal state gesture action.

An example of the voice string and an example of the gesture action for judgement will be described as follows.

1. a voice string is used for judgment:
   normal state voice string: OOO, unlock door
2. a gesture action is used for judgment:

normal state gesture action: 

If the judging result of the step G indicates that the to-be-recognized security information complies with the normal operation information, a normal operation process is performed (Step H).

When the normal operation process is performed, at least one of a door unlocking action and a system enabling action is performed.

If the judging result of the step G indicates that the to-be-recognized security information does not comply with the normal operation information, at least one of a door locking action and a system disabling action is performed (Step I).

Then, a step J is performed to identify and judge whether the number of times the to-be-recognized security information does not comply with the normal operation information excesses a threshold count value (e.g., 5). If the judging condition of the step J is not satisfied, the step C is repeatedly done.

For example, in the step J, the security authentication device identifies and judges whether the number of times the to-be-recognized security information used by the user (e.g., a voice string) complies with the normal state voice string: OOO, unlock door (i.e., the normal state voice string) excesses the threshold count value. Alternatively, in the step J, the security authentication device identifies and judges whether the number of times the to-be-recognized security information used by the user (e.g., a gesture action) complies with the normal state gesture action:  (i.e., the normal operation information) excesses the threshold count value.

If the judging result of the step J indicates that the number of times the to-be-recognized security information does not comply with the normal operation information excesses the threshold count value (e.g., 5), a step K is performed. In the step K, the user is informed that the to-be-recognized security information currently used by the user is an erroneous prompt message. Then, the flowchart is ended.

Figure 2:
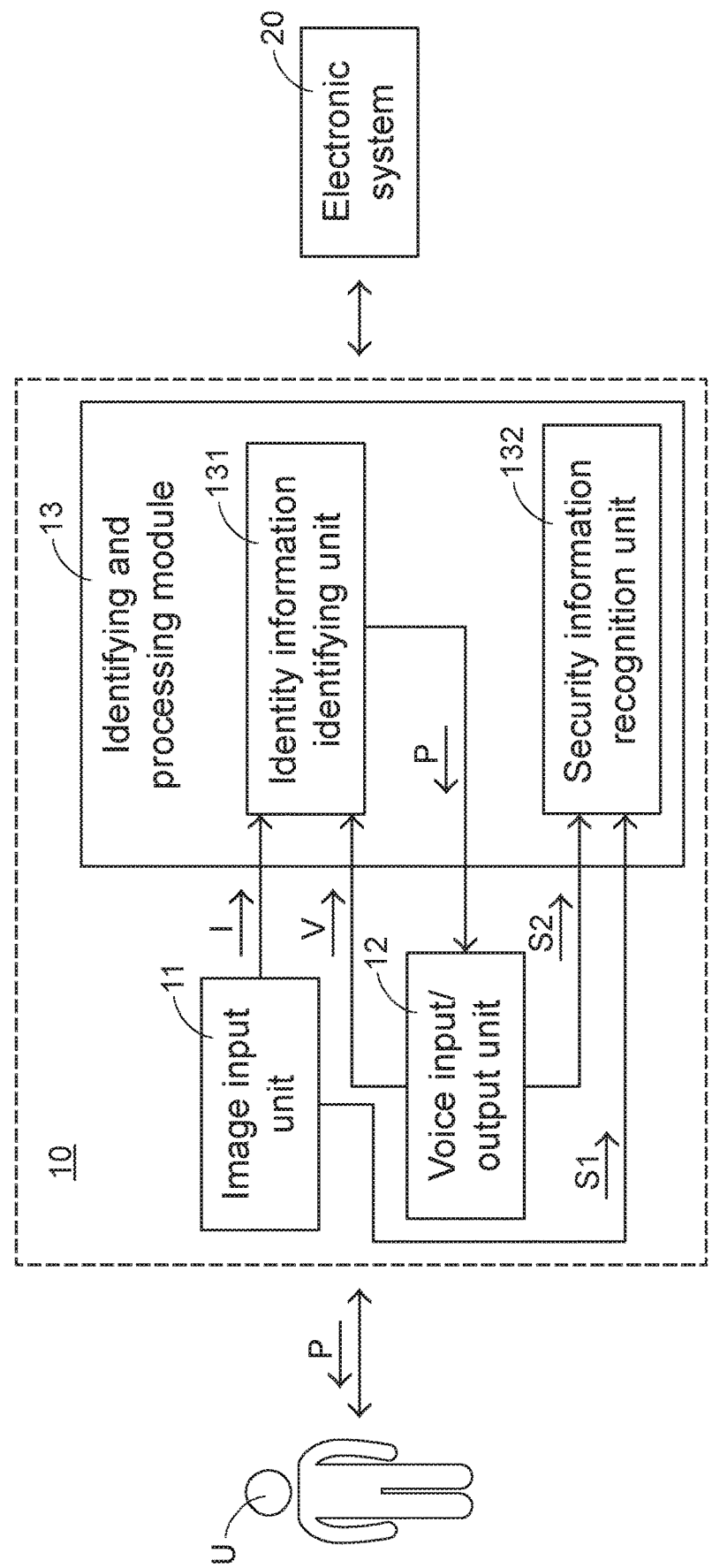
FIG. 2 is a schematic functional block diagram of a security authentication device according to an embodiment of the present invention.

For further understanding the concepts of the present invention, a security authentication device is provided. FIG. 2 is a schematic functional block diagram of a security authentication device according to an embodiment of the present invention.

As shown in FIG. 2, the security authentication device 10 at least comprises an image input unit 11, a voice input/output unit 12 and an identifying and processing module 13. A to-be-recognized image information I about a user U can be inputted into the image input unit 11. A to-be-recognized voice information V about the user U can be inputted into the voice input/output unit 12, and a security information prompt signal P can be outputted from the voice input/output unit 12 to prompt the user U. The identifying and processing module 13 is electrically connected with the image input unit 11 and the voice input/output unit 12.

After the to-be-recognized image information I and the to-be-recognized voice information V are received by the identifying and processing module 13, the identifying and processing module 13 identifies and judges whether the to-be-recognized image information I and the to-be-recognized voice information V comply with a registered image information and a registered voice information, respectively. If the to-be-recognized image information I and the to-be-recognized voice information V comply with the registered image information and the registered voice information, respectively, the identifying and processing module 13 generates the security information prompt signal P. Moreover, the security information prompt signal P is transmitted to the user U through the voice input/output unit 12.

In an embodiment, the registered image information and the registered voice information are previously stored in the identifying and processing module 13. Alternatively, the registered image information and the registered voice information are previously stored in an online database (not shown).

Moreover, a to-be-recognized security information provided by the user U in response to the security information prompt signal P can be inputted into the identifying and processing module 13. Moreover, the identifying and processing module 13 identifies and judges whether the to-be-recognized security information complies with an abnormal warning information. If the to-be-recognized security information complies with the abnormal warning information, an abnormal state warning and processing process is performed.

In an embodiment, each of the to-be-recognized security information and the abnormal warning information at least contains at least one of a voice string and a gesture action.

Preferably but not exclusively, the to-be-recognized security information contains a gesture action S1 of the user U from the image input unit 11 and a voice string S2 of the user U from the voice input/output unit 12.

Moreover, the abnormal warning information at least contains at least one of an abnormal state voice string and an abnormal state gesture action.

Preferably but not exclusively, the abnormal state voice string at least contains a voice string representing that the user is in at least one of a physical discomfort state and a hostage state, or the abnormal state gesture action at least contains a gesture action representing that the user is in at least one of the physical discomfort state and the hostage state.

When the abnormal state warning and processing process is performed, at least one of a door locking action and a system disabling action is performed, or even at least one of a security guard contact action, an emergency medical contact action and a user's current image information transmission action is performed.

Moreover, if the to-be-recognized security information does not comply with the abnormal warning information, the identifying and processing module 13 identifies and judges whether the to-be-recognized security information complies with a normal operation information. If the to-be-recognized security information complies with the normal operation information, a normal operation process is performed.

Preferably but not exclusively, the normal operation information at least contains at least one of a normal state voice string and a normal state gesture action. When the normal operation process is performed, at least one of a door unlocking action and a system enabling action is performed.

Similarly, if the to-be-recognized security information does not comply with the normal operation information, at least one of the door locking action and the system disabling action is performed.

In an embodiment, the identifying and processing module 13 comprises an identity information recognition unit 131. The identity information recognition unit 131 is electrically connected with the image input unit 11 and the voice input/output unit 12. After the to-be-recognized image information I and the to-be-recognized voice information V are received by the identity information recognition unit 131, the identity information recognition unit 131 identifies and judges whether the to-be-recognized image information I and the to-be-recognized voice information V comply with the registered image information and the registered voice information, respectively. If the to-be-recognized image information I and the to-be-recognized voice information V comply with the registered image information and the registered voice information, respectively, the identity information recognition unit 131 generates the security information prompt signal P. Moreover, the security information prompt signal P is transmitted to the user U through the voice input/output unit 12.

The identifying and processing module 13 further comprises a security information recognition unit 132. The security information recognition unit 132 is electrically connected with the identity information recognition unit 131, the image input unit 11 and the voice input/output unit 12. After the to-be-recognized security information (e.g., the gesture action S1 or the voice string S2) is received by the security information recognition unit 132, the security information recognition unit 132 identifies and judges whether to-be-recognized security information complies with the abnormal warning information. If the to-be-recognized security information complies with the abnormal warning information, the abnormal state warning and processing process is performed.

In an embodiment, the image input unit 11 is an image pickup unit, and the voice input/output unit 12 at least comprises a microphone and a loudspeaker. Preferably but not exclusively, the image input unit 11 and the voice input/output unit 12 are integrated into a single structure.

In an embodiment, the image input unit 11 and the voice input/output unit 12 are in communication with the identifying and processing module 13 through the internet.

Please refer to FIG. 2 again. At least one of the image input unit 11, the voice input/output unit 12 and the identifying and processing module 13 is combined with an electronic system 20. For example, the electronic system 20 comprises an electronic door lock (e.g., a home electronic door lock or a car electronic door lock). The image input unit 11, the voice input/output unit 12 and the identifying and processing module 13 cooperate with each other to control the on/off states of the electronic door lock or the electronic system 20.

It is noted that the example of the electronic system 20 is not restricted to the home electronic door lock or the car electronic door lock. For example, in some other embodiments, the electronic system 20 is an electronic safe deposit box any other important electronic device.

As mentioned above, the security authentication process used in the security authentication method and the security authentication device comprises two stages.

In the first stage of the security authentication process, the to-be-recognized image information I and the to-be-recognized voice information V of the user U are subjected to multiple recognition. In this way, the identity of the user U can be accurately grasped. Moreover, the identity information of the user U is confirmed according to at least two physiological feature information. Consequently, even if the recognition speed of the security authentication device 10 is increased and the recognition accuracy of a certain physiological feature information is somewhat decreased, overall recognition rate of the security authentication device 10 will not be largely reduced. In other words, during the process of authenticating the identity information of the user, the technology of the present invention can achieve better balance between the recognition speed and the recognition accuracy.

Moreover, the security authentication device issues the security information prompt signal P to actively guide and instruct the user to perform the second stage of the security authentication process. In the second stage of the security authentication process, the security authentication device interacts with the user, and the confirmation of the user is required. Consequently, the overall recognizing and processing time of the security authentication device can be effectively reduced.

Moreover, the security authentication device is capable of identifying the to-be-recognized security information (e.g., the gesture action S1 or the voice string S2) of the user U. The to-be-recognized security information is in a password-like form. According to the to-be-recognized security information, the abnormal state warning and processing process is performed to represent that the user U is in the physical discomfort state or hostage state. Consequently, the security protection for the user is enhanced more efficiently. In other words, the security authentication method and the security authentication device of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A security authentication method, at least comprising steps of:
    (a) inputting a to-be-recognized image information and a to-be-recognized voice information about a user;
    (b) identifying and judging whether the to-be-recognized image information and the to-be-recognized voice information comply with a registered image information and a registered voice information, respectively;
    (c) if the to-be-recognized image information and the to-be-recognized voice information comply with the registered image information and the registered voice information, respectively, generating and outputting a security information prompt signal;
    (d) providing a to-be-recognized security information by the user in response to the security information prompt signal;
    (e) identifying and judging whether the to-be-recognized security information complies with an abnormal warning information, wherein the abnormal state at least comprises: a voice string representing that the user is in at least one of a physical discomfort state and a hostage state, or a gesture action representing that the user is in at least one of the physical discomfort state and the hostage state; and
    (f) if the to-be-recognized security information complies with the abnormal warning information, performing an abnormal state warning and processing process,
    wherein when the abnormal state warning and processing process is performed in the step (f), at least one of a door locking action and a system disabling action is performed.

2. The security authentication method according to claim 1, wherein each of the to-be-recognized image information and the registered image information contains at least one of a facial expression feature, a physiological skeleton feature and a physiological action feature.

3. The security authentication method according to claim 1, wherein each of the to-be-recognized voice information and the registered voice information contains a voice print feature.

4. The security authentication method according to claim 1, wherein the security information prompt signal is a voice-type security information prompt signal or an image-type security information prompt signal, and the security information prompt signal prompts the user to provide a to-be-recognized security information.

5. The security authentication method according to claim 1, wherein when the abnormal state warning and processing process is performed in the step (f), at least one of a security guard contact action, an emergency medical contact action and a user's current image information transmission action is further performed.

6. The security authentication method according to claim 1, wherein after the step (e), the security authentication method further comprises steps of:
(g) if the to-be-recognized security information does not comply with the abnormal warning information, identifying and judging whether the to-be-recognized security information complies with a normal operation information; and
(h) if the to-be-recognized security information complies with the normal operation information, performing a normal operation process.

7. The security authentication method according to claim 6, wherein the normal operation information at least contains at least one of a normal state voice string and a normal state gesture action.

8. The security authentication method according to claim 6, wherein when the normal operation process is performed in the step (h), at least one of a door unlocking action and a system enabling action is performed.

9. The security authentication method according to claim 6, wherein after the step (g), the security authentication method further comprises steps of:
(i) if the to-be-recognized security information does not comply with the normal operation information, performing at least one of a door locking action and a system disabling action;
(j) identifying and judging whether a number of times the to-be-recognized security information does not comply with the normal operation information excesses a threshold count value, wherein if the number of times the to-be-recognized security information does not comply with the normal operation information does not excess the threshold count value, the step (c) is repeatedly done; and
(k) if the number of times the to-be-recognized security information does not comply with the normal operation information excesses the threshold count value, informing the user that the to-be-recognized security information currently used is an erroneous prompt message, and ending the security authentication method.

10. A security authentication device, at least comprising:
an image input unit, wherein a to-be-recognized image information about a user is inputted into the image input unit;
a voice input/output unit, wherein a to-be-recognized voice information about the user is inputted into the voice input/output unit, and a security information prompt signal is outputted from the voice input/output unit; and
an identifying and processing module electrically connected with the image input unit, and the voice input/output unit, wherein after the to-be-recognized image information and the to-be-recognized voice information are received by the identifying and processing module, the identifying and processing module identifies and judges whether the to-be-recognized image information and the to-be-recognized voice information comply with a registered image information and a registered voice information, respectively,
wherein if the to-be-recognized image information and the to-be-recognized voice information comply with the registered image information and the registered voice information, respectively, the identifying and processing module generates the security information prompt signal, and the security information prompt signal is transmitted to the user through the voice input/output unit,
wherein after a to-be-recognized security information provided by the user in response to the security information prompt signal is inputted into the identifying and processing module, the identifying and processing module identifies and judges whether the to-be-recognized security information complies with an abnormal warning information containing an abnormal state voice string or abnormal state gesture action, wherein if the to-be-recognized security information complies with the abnormal warning information, an abnormal state warning and processing process is performed including a door locking action and a system disabling action.

11. The security authentication device according to claim 10, wherein the identifying and processing module at least comprises:
an identity information recognition unit electrically connected with the image input unit and the voice input/output unit, wherein after the to-be-recognized image information and the to-be-recognized voice information are received by the identity information recognition unit, the identity information recognition unit identifies and judges whether the to-be-recognized image information and the to-be-recognized voice information comply with the registered image information and the registered voice information, respectively, wherein if the to-be-recognized image information and the to-be-recognized voice information comply with the registered image information and the registered voice information, respectively, the identity information recognition unit generates the security information prompt signal, and the security information prompt signal is transmitted to the user through the voice input/output unit; and
a security information recognition unit electrically connected with the identity information identifying unit, the image input unit and the voice input/output unit, wherein after the to-be-recognized security information is received by the security information recognition unit, the security information recognition unit identifies and judges whether to-be-recognized security information complies with the abnormal warning information, wherein if the to-be-recognized security information complies with the abnormal warning information, the abnormal state warning and processing process is performed.

12. The security authentication device according to claim 10, wherein the image input unit is an image pickup unit, and the voice input/output unit at least comprises a microphone and a loudspeaker.

13. The security authentication device according to claim 10, wherein the image input unit and the voice input/output unit are integrated into a single structure.

14. The security authentication device according to claim 10, wherein the image input unit and the voice input/output unit are in communication with the identifying and processing module through an internet.

15. The security authentication device according to claim 10, wherein at least one of the image input unit, the voice input/output unit and the identifying and processing module is combined with an electronic door lock or an electronic system, wherein the image input unit, the voice input/output unit and the identifying and processing module cooperate with each other to control on/off states of the electronic door lock or the electronic system.

16. The security authentication device according to claim 10, wherein if the to-be-recognized security information does not comply with the abnormal warning information, the identifying and processing module identifies and judges whether the to-be-recognized security information complies with a normal operation information, wherein if the to-be-recognized security information complies with the normal operation information, the identifying and processing module performs a normal operation process.

* * * * *